UNITED STATES PATENT OFFICE.

HEINRICH CLINGESTEIN, OF COLOGNE, GERMANY, ASSIGNOR TO GRASSELLI DYESTUFF CORPORATION, OF NEW YORK, N. Y., A CORPORATION OF DELAWARE.

GREEN TRISAZO DYES FOR COTTON.

No Drawing. Application filed January 6, 1928, Serial No. 245,031, and in Germany January 8, 1927.

My invention concerns new green trisazo dyes and the method of preparing same, which dyes are particularly useful for dyeing cotton goods in various green shades of exceedingly good fastness to light.

These new dyestuffs have most probably the general formula:

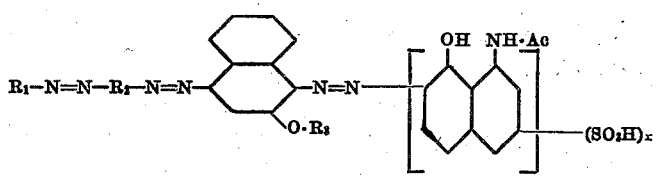

wherein $R_1$ and $R_2$ represent substituted or unsubstituted aryl residues, $R_3$ an alkyl, Ac an acidyl radical, e. g. acetyl or benzoyl and wherein the naphthalene nuclei may be further substituted and x represents the number one or two.

The new dyestuffs can be obtained by coupling a diazotized amino-azo-compound e. g. amino-azo-toluene-sulfonic acid, the azocompound obtainable from aniline-4-sulfonic acid and ortho-toluidine, with a 1-amino-2-naphtol-ether or a derivative thereof, such as 1-amino-2-naphtol-ethyl-ether-6-sulfonic acid, diazotizing the intermediate product and coupling in an alkaline agent e. g. in a soda alkaline solution with or without the addition of pyridine, with a 1-acidyl-amino-8-hydroxy-naphthalene-sulfonic acid. The addition of pyridine accelerates the coupling.

My new dyestuffs are in the form of their alkali metal salts generally dark powders soluble in water and dyeing cotton various green shades of excellent fastness to light, yielding upon reduction with stannous chloride and hydrochloric acid one molecule of a substituted or unsubstituted aromatic monoamine, one molecule of a substituted or unsubstituted aromatic diamine, one molecule of an 1.4-diamino-2-alkoxynaphthalene and one molecule of a 1-acidyl-amino-7-amino-8-naphthol-sulfonic acid.

In order to illustrate my invention the following examples are given, all parts being by weight:

*Example 1:* 29.1 parts of the azo-dyestuff prepared in the customary manner from para-sulfanilic acid and ortho-toluidine are diazotized with 6.9 parts of sodium nitrite and hydrochloric acid and after neutralizing the hydrochloric acid with sodium acetate, 26.7 parts of 1-amino-2-naphthol-ethyl-ether-6-sulfonic acid dissolved in sodium carbonate solution are added. After the completion of the coupling, the intermediate product is isolated and diazotized with 6.9 parts of sodium nitrite and hydrochloric acid. The diazo-compound is filtered and introduced into a solution of 42.3 parts of benzoyl-1-amino-8-hydroxy-naphthalene-3.6-disulfonic acid, which has been rendered alkaline with sodium carbonate, to which pyridine has been added. The resulting dyestuff having in its free state the following formula:

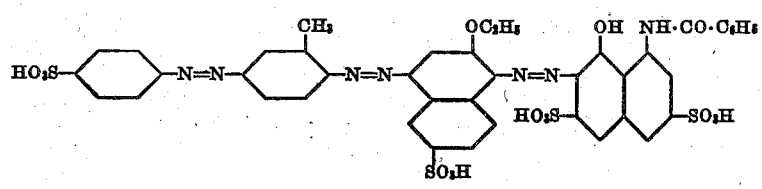

dyes cotton in blueish-green shades.

*Example 2:* 30.7 parts of amino-azo-toluene-sulfonic acid are diazotized in the customary manner with 6.9 parts of sodium nitrite and hydrochloric acid and coupled with a solution of 26.7 parts of 1-amino-2-naphthol-ethyl-ether-6-sulfonic acid in sodium carbonate solution, whilst neutralizing with sodium acetate. The intermediate product is isolated and further diazotized with 6.9 parts of sodium nitrite and hydrochloric acid, the diazo-compound is isolated and introduced whilst stirring into a solution of 46 parts of ortho-chloro-benzoyl-1-amino-8-naphthol-3.6-disulfonic acid, rendered alkaline with sodium carbonate to which pyridine has been added. The resulting dyestuff having in its free state the following formula:

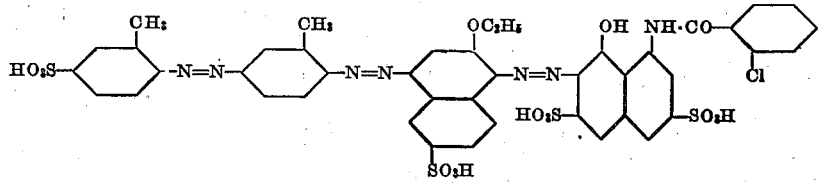

dyes cotton green shades.

*Example 3:* 22.3 parts of 2-naphthylamino-8-sulfonic acid are diazotized with 6.9 parts of sodium nitrite and hydrochloric acid, made neutral to Congo with sodium acetate and coupled with 16 parts of aniline-omega-methane-sulfonic acid. The dyestuff is saponified by boiling with caustic soda lye, the solution is neutralized with acid and the dyestuff salted out and filtered. It is then again diazotized with 6.9 parts of sodium nitrite and hydrochloric acid neutralized with sodium acetate and coupled with a solution of 26.7 parts of 1-amino-2-naphthol-ethyl-ether-6-sulfonic acid in sodium carbonate solution. The intermediate product is isolated and further diazotized with 6.9 parts of sodium nitrite and hydrochloric acid, the diazo-compound is isolated and introduced into a solution of 38 parts of acetyl-1-amino-8-naphthol-3.6-disulfonic acid, rendered alkaline with sodium carbonate to which pyridine has been added. The resulting dyestuff having in its free state the following formula:

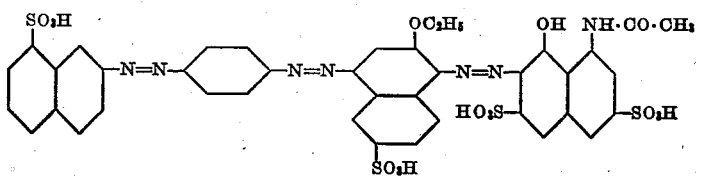

dyes cotton green shades.

*Example 4:* 22.3 parts of 2-naphthylamino-8-sulfonic acid are diazotized by 6,9 parts of sodium nitrite and hydrochloric acid, made neutral to Congo with sodium acetate and coupled with 12,5 parts of s-xylidine. The intermediate product is salted out and filtered and then is again diazotized with 6,9 parts of sodium nitrite and hydrochloric acid, neutralized with sodium acetate and coupled with a solution of 26,7 parts of 1-amino-2-naphthol-ethyl-ether-6-sulfonic acid in sodium carbonate solution. The intermediate product is isolated and further diazotized with 6.9 parts of sodium nitrite and hydrochloric acid, the diazo-compound is isolated and introduced into a solution of 38 parts of acetyl-1-amino-8-naphthol-3.6-disulfonic acid rendered alkaline with sodium carbonate to which pyridine has been added. The resulting dyestuff having in its free state the following formula:

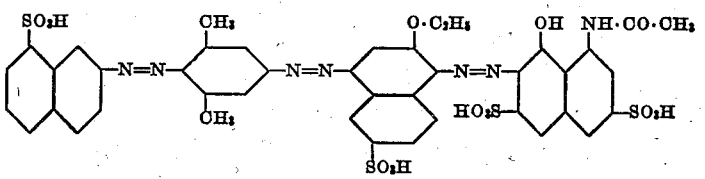

dyes cotton green shades. Upon reduction with stannous chloride and hydrochloric acid one molecule of 2-amino-naphthalene-8-sulfonic acid, one molecule of 1.4-diamino-2.6-dimethyl benzene, one molecule of 1.4-diamino-2-ethoxy-naphthalene-6-sulfonic acid and one molecule of 1-acetyl-amino-7-amino-8-naphthol-3.6-disulfonic acid are obtained.

Similar dyestuffs are obtained by employing ortho-chlorobenzoyl-1-amino-8-naphthol-3.6-disulfonic acid, benzoyl or ortho-chlorobenzoyl-1-amino-8-naphthol-4-6-disulfonic acid and the like.

I claim:

1. Process for the manufacture of trisazodyestuffs, which process comprises combining a diazotized amino-azo-compound with a 1-amino-2-alkoxynaphthalene wherein the naphthalene nucleus may be further substituted, and coupling the diazotized intermediate product with a 1-acidyl-amino-8-hydroxynaphthalene sulfonic acid in an alkaline solution.

2. Process for the manufacture of trisazodyestuffs, which process comprises combining a diazotized amino-azo-compound with a 1- amino - 2 - ethoxy - naphthalene wherein the naphthalene nucleus may be further substituted, and coupling the diazotized intermediate product with a 1-acidyl-amino-8-hydroxynaphthalene sulfonic acid in an alkaline solution.

3. Process for the manufacture of trisazodyestuffs, which process comprises combining diazotized 2-naphthylamino-8-sulfonic-acid-azo-s-xylidine with 1-amino-2-ethoxy-naphthalene-6-sulfonic acid and coupling the diazotized intermediate product with 1-acetyl-amino-8-naphthol-3.6-dilsulfonic acid in a soda alkaline solution with the addition of pyridine.

4. As new products trisazodyestuffs having in their free state most probably the general formula:

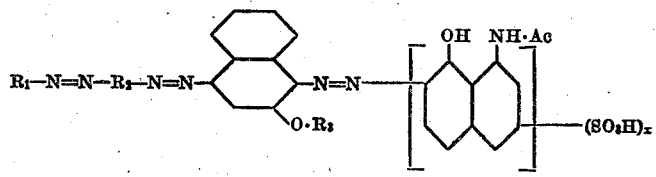

wherein $R_1$ and $R_2$ represent substituted or unsubstituted aryl residues, $R_3$ and alkyl, Ac an acidyl radical, and wherein the naphthalene nuclei may be further substituted and x represents the number one or two, being dark powders, soluble in water and dyeing cotton various green shades, of excellent fastness to light, yielding upon reduction with stannous chloride and hydrochloric acid one molecule of an aromatic mono-amine, one molecule of an aromatic diamine, one molecule of an 1.4-diamino-2-alkoxynaphthalene and one molecule of an 1-acidyl-amino-7-amino-8-naphthol-sulfonic acid.

5. As new products trisazodyestuffs having in their free state most probably the general formula:

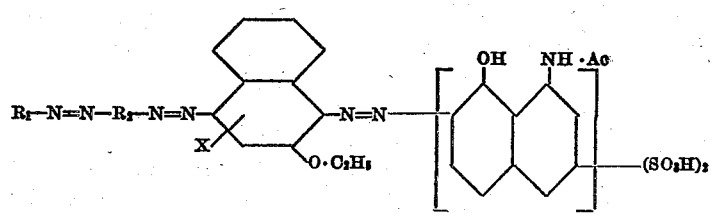

wherein $R_1$ represents a naphthalene residue which may be substituted and $R_2$ a benzene residue which may be further substituted, Ac an acidyl radical and x hydrogen or a sulfonic acid group, being dark powders soluble in water and dyeing cotton various green shades of excellent fastness to light, yielding upon reduction with stannous chloride and hydrochloric acid one molecule of an aromatic mono-amine, one molecule of an aromatic diamine, one molecule of an 1.4-diamino-2-alkoxy-naphthalene or a sulfonic acid thereof and one molecule of an 1-acidyl-amino-7-amino-8-naphthol-disulfonic acid.

6. As a new product the dyestuff having in its free state most probably the formula:

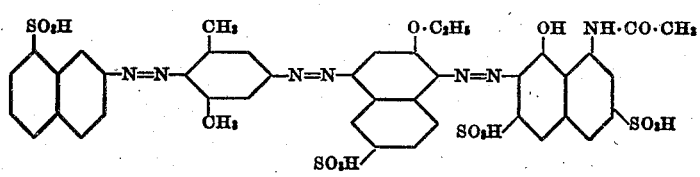

being a dark powder, soluble in water and dyeing cotton green shades of excellent fastness to light, yielding upon reduction with stannous chloride and hydrochloric acid 2-amino - naphthalene - 8 - sulfonic acid, 1.4-diamino-3.5-dimethyl-benzene, 1.4 - diamino- 2 -ethoxy-naphthalene 6-sulfonic acid and 1-acetyl-amino-8-hydroxy - 7 - amino-naphthalene-3.6-disulfonic acid.

In testimony whereof I have hereunto set my hand.

HEINRICH CLINGESTEIN.